United States Patent
Huang et al.

(10) Patent No.: US 10,204,180 B1
(45) Date of Patent: Feb. 12, 2019

(54) METHOD, SYSTEM, AND COMPUTER PROGRAM PRODUCT FOR IMPLEMENTING ELECTRONIC DESIGNS WITH AUTOMATICALLY GENERATED POWER INTENT

(71) Applicant: Cadence Design Systems, Inc., San Jose, CA (US)

(72) Inventors: Kai-Ti Huang, Cupertino, CA (US); Pinhong Chen, Saratoga, CA (US); Richard M. Chou, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 538 days.

(21) Appl. No.: 14/973,326

(22) Filed: Dec. 17, 2015

(51) Int. Cl.
*G06F 17/50* (2006.01)

(52) U.S. Cl.
CPC .......... *G06F 17/50* (2013.01); *G06F 17/5045* (2013.01); *G06F 17/5068* (2013.01)

(58) Field of Classification Search
CPC ...................................................... G06F 17/50
See application file for complete search history.

(56) References Cited

U.S. PATENT DOCUMENTS

| | | | |
|---|---|---|---|
| 7,551,985 B1 * | 6/2009 | Chen ..................... | G06F 17/505 700/286 |
| 7,954,078 B1 * | 5/2011 | Wang .................... | G06F 17/505 716/106 |
| 8,732,630 B1 | 5/2014 | Kolpekwar et al. | |
| 8,732,636 B2 | 5/2014 | Ginetti et al. | |
| 8,762,906 B2 | 6/2014 | Ginetti et al. | |
| 8,949,753 B1 | 2/2015 | Kolpekwar et al. | |
| 9,058,440 B1 | 6/2015 | Kolpekwar | |
| 9,104,824 B1 | 8/2015 | Loh et al. | |
| 9,141,741 B1 | 9/2015 | Lin et al. | |
| 9,501,592 B1 | 11/2016 | Kolpekwar et al. | |
| 2007/0245285 A1 * | 10/2007 | Wang ................... | G06F 17/505 716/104 |
| 2009/0089725 A1 * | 4/2009 | Khan ............... | G01R 31/31721 716/106 |
| 2010/0192115 A1 * | 7/2010 | Yang ................... | G06F 17/5022 716/104 |
| 2011/0161899 A1 * | 6/2011 | Ginetti ................ | G06F 17/5022 716/106 |

(Continued)

OTHER PUBLICATIONS

U.S. Appl. No. 13/886,191, filed May 20, 2013.

(Continued)

*Primary Examiner* — Aniss Chad
*Assistant Examiner* — Chuen-Meei Gan
(74) *Attorney, Agent, or Firm* — Vista IP Law Group, LLP

(57) ABSTRACT

Various embodiments implement an electronic design with automatically generated power intent. One or more inputs to a physical electronic design implementation module may be identified for power intent generation for an electronic design. The power intent for the electronic design may be generated by using at least one or more power related characteristics that are determined from at least the one or more inputs for the power intent generation. With the generated power intent, the electronic design may be implemented at least by guiding the implementation of the electronic design with at least the generated power intent while reducing usage of one or more computing resources.

25 Claims, 17 Drawing Sheets

(56) References Cited

U.S. PATENT DOCUMENTS

| | | | |
|---|---|---|---|
| 2012/0198408 A1* | 8/2012 | Chopra | G06F 17/504 716/127 |
| 2013/0338991 A1* | 12/2013 | Lin | G06F 17/5036 703/14 |
| 2016/0103943 A1* | 4/2016 | Xia | G06F 17/5081 716/108 |

OTHER PUBLICATIONS

SI Initiative. "Common Power Format (CPF) 2.0 Specification. Silicon Integration Initiative (Si2).." Inc., http://www. sit2.org 5 (2011).

"IEEE Standard for Design and Verification of Low Power Integrated Circuits, IEEE Std 1801™-2009", IEEE Computer Society, Mar. 2009.

* cited by examiner

| V Covers | PD_in | PD_out | PD_en | PD_P | PD_B |
|---|---|---|---|---|---|
| PD_in | O | O | | | |
| PD_out | | O | | | |
| PD_en | O | O | O | | O |
| PD_P | | | | O | |
| PD_B | O | | | | O |

FIG. 5A

METHOD, SYSTEM, AND COMPUTER PROGRAM PRODUCT FOR IMPLEMENTING ELECTRONIC DESIGNS WITH AUTOMATICALLY GENERATED POWER INTENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Standardized power formats have been used in purely digital designs, analog/mixed-signal (AMS) design, and digital/mixed-signal designs to describe power intent, power management data, power-specific data, or other data generally related to power (collectively "power data" hereinafter) at various stages of the electronic design automation (EDA) of these designs. These standardized power formats such as CPF (Common Power Format from "Si2 Common Power Format Specification" of Si2 or Silicon Integration Initiative) or UPF (Unified Power Format from IEEE or Institute of Electrical and Electronic Engineers in 1801-2009-IEEE Standard for Design and Verification of Low Power Integrated Circuits") are directed at specifying power data for the design or specifying power intent and implementation of the design just once such that various EDA design tools may consistently use the power data to automatically insert power control features or to check that the result matches the power intent during the design process. General details about some exemplary standardized power formats may be found in "Si2 Common Power Format Specification", Ver. 2.0, Silicon Integration Initiative, Inc., Feb. 14, 2011 and IEEE Standard "1801-2009-IEEE Standard for Design and Verification of Low Power Integrated Circuits", IEEE Mar. 27, 2009, the content of both documents is hereby explicitly incorporated by reference for all purposes.

Nonetheless, power intent in a standardized power format may often be unavailable, incomplete, or erroneous in one or more stages of electronic design implementation. For example, power intent may be made available to synthesis, simulation, and/or verification tasks but not necessarily so for layout designers who create and complete the physical design for manufacturing the underlying electronic design. The ECO (engineering change order) or the ECN (engineering change notice) process that aims at effecting changes to the electronic design further exacerbates the issues because power intent is generally unavailable to a design engineer implementing the ECO or ECN process. Even if the power intent may be available in some cases, the power intent may be specified in one particular format (e.g., in a CPF file, an UPF file, etc.), the provided power intent may not be compatible with the EDA tools that are used to manipulate the electronic designs, and the power intent may often be incomplete or outdated so as to provide compromised or reduced usability.

Therefore, there exists a need for methods and apparatuses for implementing an electronic design with automatically generated power intent.

SUMMARY

Disclosed are method(s), system(s), and article(s) of manufacture for implementing an electronic design with automatically generated power intent in one or more embodiments. Some embodiments are directed at a method for implementing an electronic design with automatically generated power intent. In these embodiments, one or more inputs to a physical electronic design implementation module may be identified for power intent generation for an electronic design. The power intent for the electronic design may be generated by using at least one or more power related characteristics that are determined from at least the one or more inputs for the power intent generation. With the generated power intent, the electronic design may be implemented while reducing usage of one or more computing resources at least by guiding the implementation of the electronic design with at least the generated power intent. In some of these embodiments, the one or more inputs comprising connectivity information and a data structure storing therein voltage information for the electronic design, and the electronic design is associated with or has no, incomplete, or incorrect power intent data prior to generation of the power intent.

In some of these embodiments, the one or more inputs may be identified by identifying connectivity information including at least a physical netlist or a layout from a data store. A plurality of power pins and/or a plurality of ground pins may be identified from the connectivity information. A number of libraries may be identified for at least one power pin from a reference set of libraries based in part or in whole upon the physical netlist or the layout, and a plurality of connections running to and/or from the plurality of power pins and/or the plurality of ground pins may be identified. In addition, voltage information for the at least one power pin may be extracted from a data structure; and one or more power domains may be determined by using at least the plurality of connections and the voltage information.

In some embodiments, one or more power domains may be determined for the electronic design; and one or more instances in the electronic design may then be associated with the one or more power domains. In addition or in the alternative, a net in the electronic design may be identified at least by examining the one or more inputs comprising connectivity information that further includes at least a physical netlist or a layout of the electronic design; and one or more power domains may be determined for the net at least by identification of one or more multi-voltage cells or blocks and a reference to a voltage value at a node along the net.

Additionally or alternatively, determining the one or more power domains may include identifying at least one cell of a power switch cell, a voltage regulator cell, or a combination of a power switch cell and a voltage regulator cell (collectively a power switch cell hereinafter) connected to the net. One or more attributes of a set of libraries referenced by the at least one cell may be identified; one or more internal nets may also be identified for the at least one cell based in part or in whole upon the one or more attributes; and one or more internal power domains may be generated for the one or more internal nets at least by identification of one or more multi-voltage cells or blocks and a reference to a voltage value at a node along the net. It shall be noted that the term "power switch cell" may collectively refer to a power switch cell, a voltage regulator cell, or a combination of a power switch cell and a voltage regulator cell throughout this entire application, unless otherwise specifically claimed or described. In addition or in the alternative, various techniques described herein and applied to a "power switch cell" may also be applied to a "power gating cell" with full and equal effects.

In some embodiments, associating the one or more instances in the electronic design with the one or more power domains may include the act of identifying an instance in the electronic design at least by examining the one or more inputs comprising connectivity information that further includes at least a physical netlist or a layout of the electronic design. At least one power pin and/or at least one ground pin of the instance may be identified based in part or in whole upon the connectivity information; and one or more connections to and/or from the at least one power pin and/or the at least one ground pin may also be identified.

In some of these immediately preceding embodiments, one or more first power domains may be determined for the one or more connections; and a determination may be made to decide whether the instance includes only the at least one power pin and no other power pins. In addition, a power net connected to the at least one power pin and a first power domain of the power net may be identified when the instance includes only the at least one power pin; and the instance may then be associated with the first power domain of the power net.

In some embodiments, a set of libraries of a power domain may be generated for the one or more power domains. In some of these embodiments, a supply voltage set may be identified for the electronic design and voltage information from or associated with the power domain; available libraries for the electronic design may be identified; and a determination may be made to decide whether one or more voltage values in the available libraries match the voltage information from or associated with the power domain.

In the alternative, the one or more libraries may be identified into the set of libraries for the power domain when the one or more voltage values in the one or more libraries match the voltage information from or associated with the power domain; and the set of libraries may then be associated with the power domain. In some other embodiments, one or more interpolations, extrapolations, and/or approximations may be performed between or among a plurality of libraries based in part or in whole upon the voltage information from or associated with the power domain when the no voltage values in the available libraries match the voltage information from or associated with the power domain; the set of libraries may be generated for the power domain that corresponds to the voltage information that does not match any voltage values in the available libraries; and the set of libraries may then be associated with the power domain.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein.

Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5A illustrates an example of a power domain coverage map in some embodiments.

DETAILED DESCRIPTION

Figure 1A:
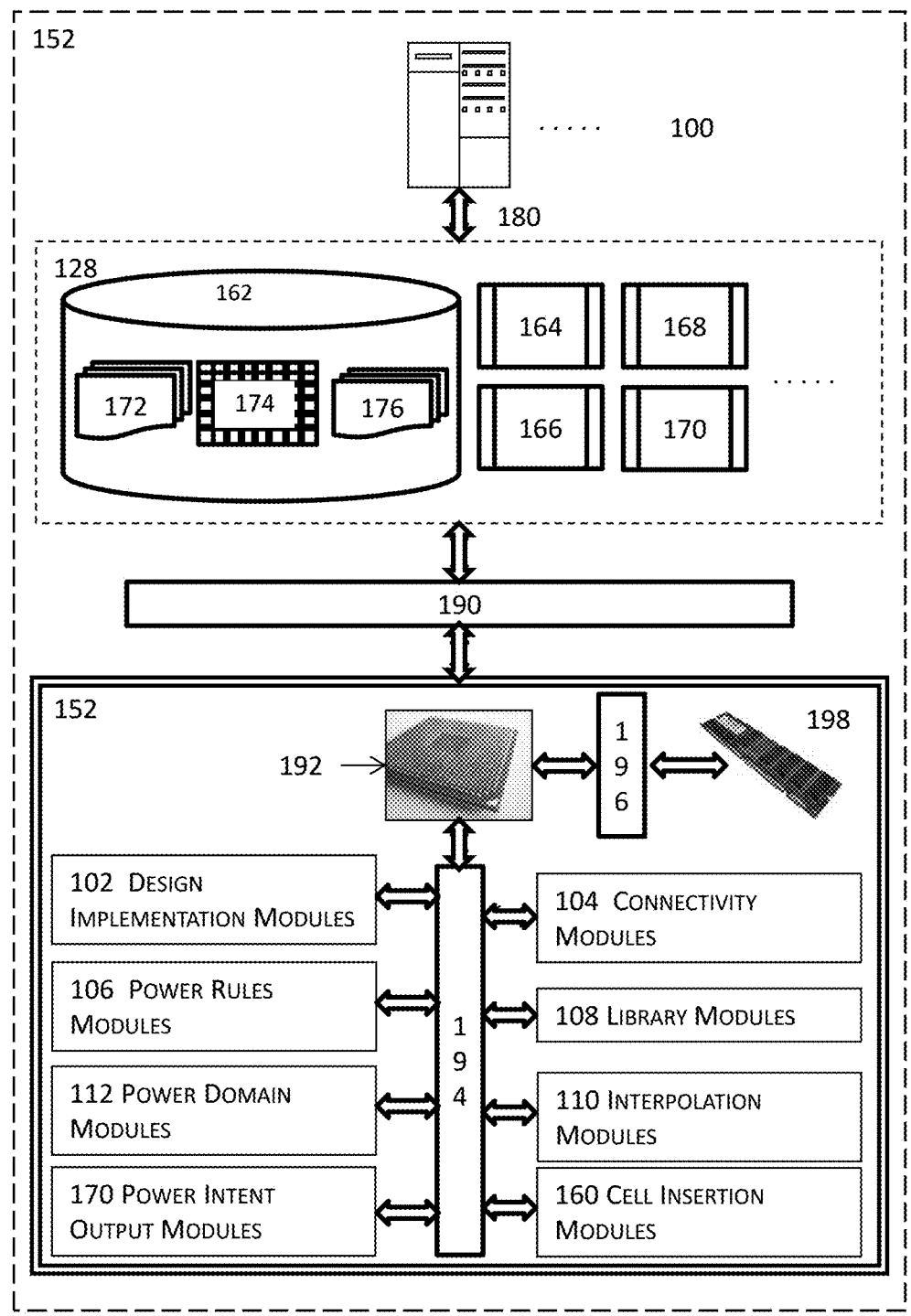
FIG. 1A illustrates a high level block diagram of a hardware system for implementing an electronic design with automatically generated power intent in one or more embodiments.

Various embodiments of the invention are directed to methods, systems, and articles of manufacture for implementing an electronic design with automatically generated power intent. Other objects, features, and advantages of the invention are described in the detailed description, figures, and claims.

In some embodiments, these methods or apparatuses described herein receive or identify one or more inputs that may include, for example, connectivity information from one or more sources that further comprises, for example, a physical layout, a physical netlist, etc. for an electronic design of interest or a portion thereof. The one or more inputs may further include information concerning physical characteristics (e.g., sizes, shapes, locations, etc.) of power and/or ground pins may be identified or extracted from the connectivity information.

In addition or in the alternative, connections to and from the power and/or ground pins may also be extracted or identified into the one or more inputs from the connectivity information. The power nets and one or more electrical characteristics (e.g., voltages, etc.) thereof may also be identified or extracted for the power nets into the one or more inputs in some embodiments. In some of these embodiments, physical information such as global power grid, power stripes, or standard cell rows may also be identified into the one or more inputs for subsequent determination of power domain boundaries. A power domain includes one or more areas in an electronic design that are grouped by common power environments and power strategy (e.g., power down conditions, operating voltage, and/or power supply nets, etc.) A power domain may be physically represented in an electronic design by using, for example, a voltage area.

With these one or more inputs, data related to power intent (or simply power intent data) may be determined, extracted, implied, or inferred for the electronic design of interest or the portion thereof by using at least the one or more inputs. The power intent data may include, for example, voltages for power nets, power states, power domains, electrical rules, and/or any other suitable information or data that may be used to implement the electronic design or the portion thereof in some embodiments. With the power intent data, one or more existing power rules may be identified, or one or more new power rules may be generated.

These one or more power rules may be used to guide subsequent implementations of the electronic design or the portion thereof. These one or more power rules may include, for example, an isolation rule that prevent a direct connection from an off state to an on state, a level shifter rule that prevents a direct connection between two power domains at two different voltages, a power rule involving an enable condition, a specific exclude or include power rule, or any other suitable power rules, etc. In some embodiments where physical information such as global power grid, power stripes, or standard cell rows is also identified or extracted, the physical domain boundaries of power domains may also be generated.

The electronic design of interest or the portion thereof may thus be implemented based in part or in whole upon the power intent data and/or the one or more power rules and optionally the power domain boundaries to ensure that the implementation observes or conforms to the power intent data and/or the one or more power rules and optionally the power domain boundaries.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level block diagram of a system for implementing an electronic design with automatically generated power intent in one or more embodiments. In these one or more embodiments, FIG. 1A illustrates a high level block diagram of a hardware system and may comprise one or more computing systems 100, such as one or more general purpose computers described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc. The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms or modules 152 including hardware and software modules or combinations of one or more hardware and one or more software modules that are stored at least partially in computer memory may comprises one or more design implementation modules 102 to implement electronic designs at various abstraction levels (e.g., schematic level, layout level, etc.) The set of modules 152 may further include one or more connectivity modules 104 to identify or determine data or information such as nets, netlists (e.g., physical netlists), power and/or ground pins, connections to and from power and/or ground pins, connections of one or more nets, etc. . . .

The set of modules 152 may further optionally include one or more power rules modules 106 to identify or determine power rules (e.g., low power rules, etc.) from, for example, a physical layout, a physical netlist, etc. of an electronic design. In addition or in the alternative, the set of modules 152 may further include one or more library modules 108 to select libraries for power domains. In some embodiments, the set of modules 152 may further include one or more interpolation modules 110 to interpolate, extrapolate, or compute approximations for libraries that do not exactly match the supply voltage set of an electronic design or a portion thereof. In addition or in the alternative, the set of modules 152 may comprise one or more cell insertion modules 160 to insert one or more cells (e.g., a level shifter cell, an isolation cell, etc.) to conform an electronic design or a portion thereof to one or more power rules.

The set of modules 152 may further include a power intent output modules that generate the automatically generated power intent in one or more desired or required formats (e.g., CPF, UPF, etc.) The set of modules 152 may further optionally include one or more signoff modules (not shown) to perform various signoff and design closure tasks. For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level or better accuracy to ensure an electronic design meets or exceeds power, performance, and/or area goals in some embodiments.

The one or more signoff modules may include one or more physical verification modules to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more modules in the set of modules 152. One or more modules in the set 152 may include or at least function in tandem with a microprocessor 192 via a computer bus 194 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
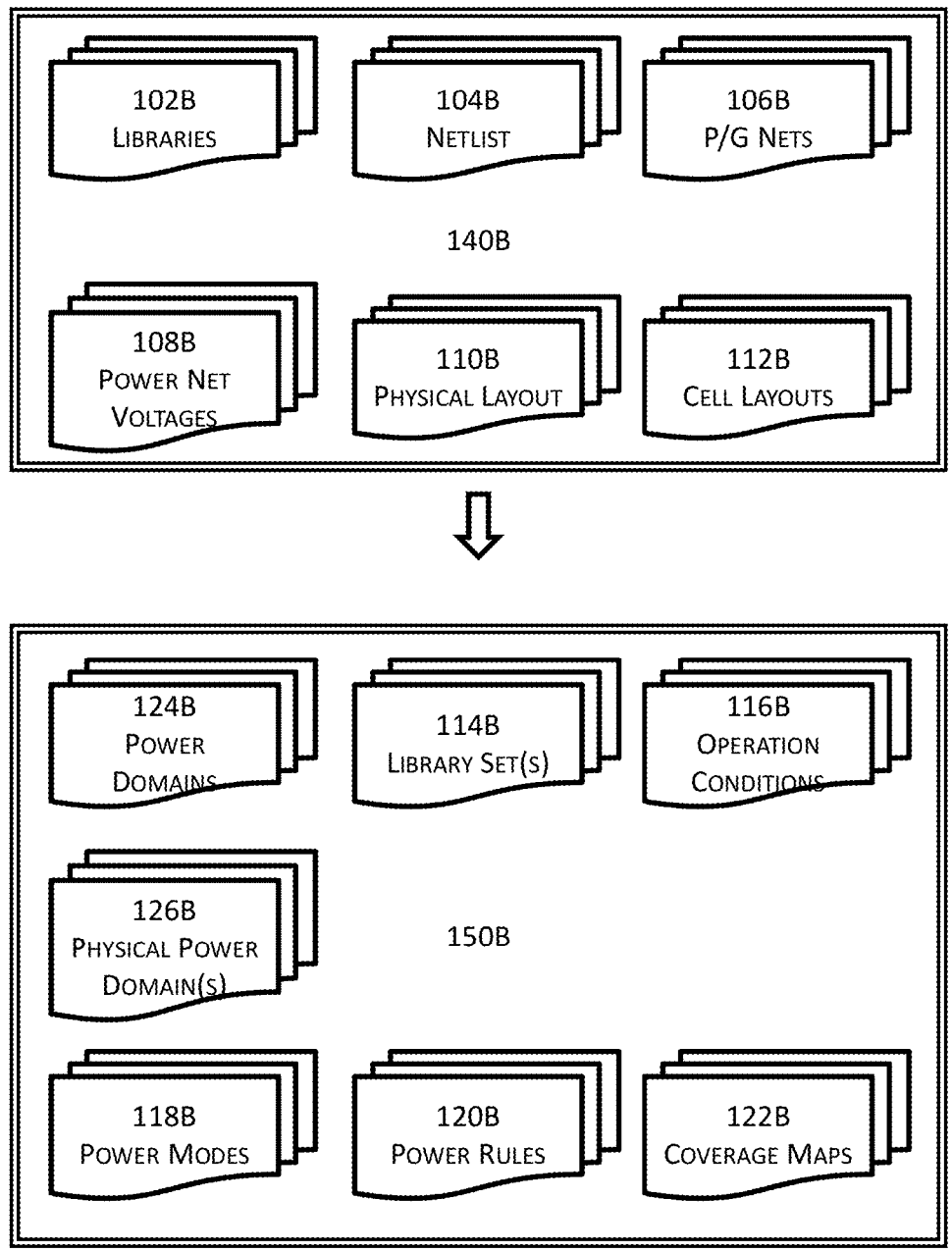
FIG. 1B illustrates some examples of inputs and some examples of power intent that may be automatically generated by some techniques described herein in one or more embodiments.

FIG. 1B illustrates some examples of inputs and some examples of power intent that may be automatically generated by some techniques described herein in one or more embodiments. More specifically, FIG. 1B illustrates some examples of inputs 140B of an electronic design or a portion thereof that may be provided to, for example, one or more modules in the set of modules 152 of FIG. 1A. These examples of inputs may include at least one of libraries 102B (e.g., timing libraries, cell libraries, design libraries, etc.), netlists 104B (e.g., a physical netlist in Verilog), power and/or ground nets 106B, power and/or ground voltages 108B, physical layout 110B (e.g., a physical layout in a format such as a design exchange format or DEF that represents a layout of an electronic design and including a netlist and circuit layout), and/or one or more cell layouts 112B (e.g., a physical layout generated by a place and route tool in a format such as a library exchange format or LEF that represents an electronic design and includes information comprising design rules and abstract information such as abstract views about cells or blocks). More details about the identification, selection, and/or determination of power domains, library sets, power modes, power rules, and coverage maps will be described in subsequent paragraphs with reference to FIGS. 2-5B below.

When one or more of these inputs are provided to a system described herein (e.g., the system illustrated in FIG. 1A), the system uses various techniques described herein and automatically generates the power intent 150B for an electronic design or a portion thereof. Some examples of the automatically generated power intent may include at least one of the power domains 124B, one or more sets of libraries 114B (e.g., a set of select libraries for an analysis view), the operating conditions 116B, the power modes 118B, power rules 120B, and/or one or more physical power domains 126B that may be used to guide or control subsequent implementation of the electronic design or a portion thereof, and/or one or more coverage maps for different nets. The following pseudo code provides an example of analysis views and the associated information for the power domains and library sets.

Analysis view std (VDDTOP@"1.1V VDDA@"1.2V VDD@°0.9V)
        PD_VDDTOP (lib_high)
        PD_VDDA (libA)
        PD_VDD (libcore09, libstd09)
        PD_VDDI (lib_low)
    Analysis view high (VDDTOP@"1.1V VDDA@"1.2V VDD@"1.1V)
        PD_VDDTOP (lib_high)
        PD_VDDA (libA)
        PD_VDD (libcore11, libstd11)
        PD_VDDI (lib_high)

Various techniques may generate the output in any format such as any standardized power formats (e.g., CPF, UPF, etc.) or any suitable proprietary formats that may be referenced and read by other EDA tools for implementations of electronic designs.

Figure 2:
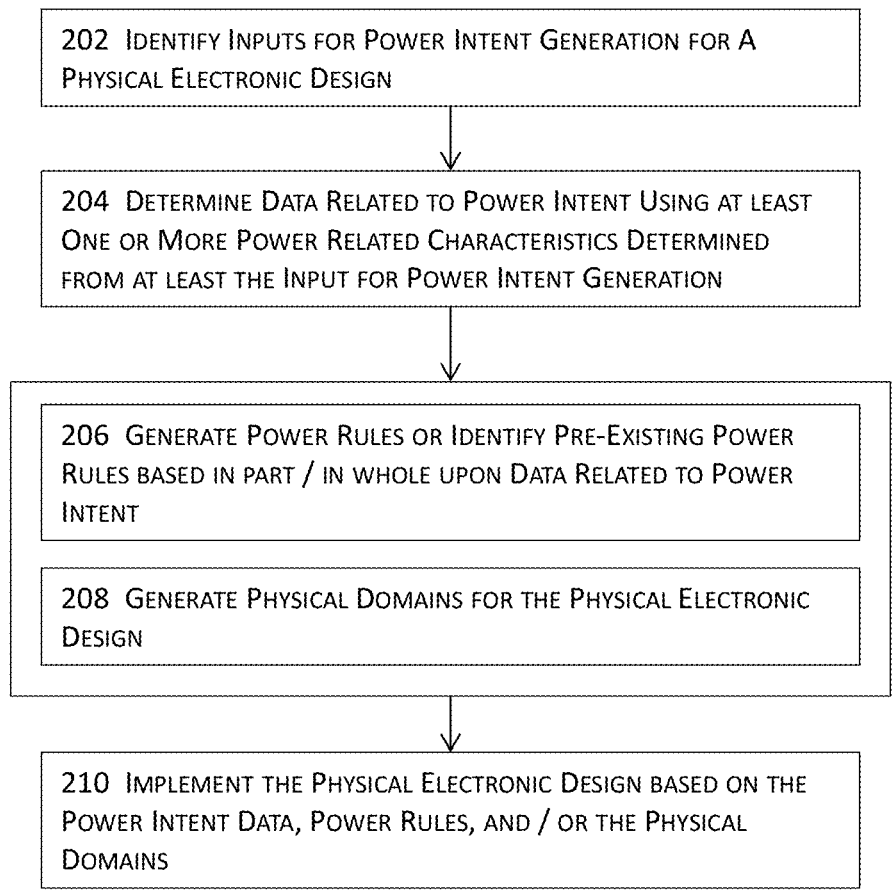
FIG. 2 illustrates a high level block diagram for implementing an electronic design with automatically generated power intent in some embodiments.

FIG. 2 illustrates a high level block diagram for implementing an electronic design with automatically generated power intent in some embodiments. In these embodiments, one or more inputs may be identified for a physical electronic design (e.g., a layout or a portion thereof) at 202 for automatic power intent generation. The one or more inputs may include, for example, connectivity information from one or more sources that further comprises a physical layout, a physical netlist, or any other sources that may provide information for power pins (e.g., primary power pins, related power pins that are related to the corresponding primary power pins, backup power pins, etc.) and/or ground pins and connections to and from these power pins and/or ground pins, etc. for the physical electronic design. The one or more inputs may further include information concerning physical characteristics (e.g., sizes, shapes, locations, etc.) of power and/or ground pins may be identified or extracted from the connectivity information.

In addition or in the alternative, connections to and from the power and/or ground pins may also be extracted or identified into the one or more inputs from the connectivity information. For example, power and/or ground pins as well as connections therefor may be extracted from a physical netlist, if available, or may be identified by parsing the physical electronic design or a physical design database for the physical electronic design. The power nets and one or more electrical characteristics (e.g., voltages, etc.) thereof may also be identified or extracted for the power nets into the one or more inputs in some embodiments.

In some embodiments where the one or more inputs include voltage information, the voltage information includes primary voltages at the nodes where instances of, for example, cells, blocks, or individual circuit components are connected to power rails or voltage regulators that power these instances. In some of these embodiments, the voltage information does not include any derived voltages that are derived from the primary voltages. In the example illustrated in FIG. 4F, the simplified electronic design includes a portion of a power rail 402F that is connected to three instances of cells 410F, 412F, and 414F via respective MOSFETs (metal oxide semiconductor field effect transistors) 404F, 406F, and 408F. These three instances of cells 410F, 412F, and 414F may be controlled by respective power switches in some embodiments. One of the electrical characteristics to be identified or extracted is the voltage (e.g., $V_{DD}$) at the node 416F at which the MOSFETs 404F, 406F, and 408F are connected to the power rail 402F in some embodiments. The voltage values at the inputs of these instances may also be derived from the voltage values of the corresponding nodes of the MOSFETs in some of these embodiments. For example, the voltage value at node 418F may be derived from that of 416F because node 418F and 416F have the same voltage value in this example illustrated in FIG. 4F.

In some of these embodiments, physical information such as the global power grid, power rails on metal 1 (M1), power stripes, and/or standard cell rows may also be identified into the one or more inputs for subsequent determination of power domain boundaries. With these one or more inputs, data related to power intent (or simply power intent data) may be determined, extracted, implied, or inferred at 204 for the physical electronic design by using at least one or more power related characteristics that are determined from at least the one or more inputs. The power intent data may include, for example, voltages for power nets, power states, power domains, electrical rules, and/or any other suitable information or data that may be used to implement the electronic design or the portion thereof in some embodiments. More details about these one or more power related characteristics determined from at least the one or more inputs will be described in subsequent paragraphs with reference to FIGS. 3A-F. It shall be noted that although these embodiments illustrated in FIG. 2 refer to a physical electronic design such as a layout, these techniques described herein apply with full and equal effects to any other types of electronic designs (e.g., a schematic design) so long as the electronic design includes the information for the identification of these one or more inputs.

With the power intent data, one or more existing power rules may be identified, or one or more new power rules may be generated at 206. These one or more power rules may be used to guide subsequent implementations of the electronic design or the portion thereof. These one or more power rules may include, for example, an isolation rule that prevent a direct connection from an off state to an on state, a level shifter rule that prevents a direct connection between two power domains at two different voltages, a power rule involving an enable condition, a specific exclude or include power rule, or any other suitable power rules, etc.

In some embodiments where physical information such as global power grid, power rails, power stripes, or standard cell rows is also identified or extracted, the physical domain boundaries of power domains may also be generated at 208. It shall be noted that the act of generating or identifying one or more power rules at 206 and the act of generating physical domain boundaries at 208, when performed, may be performed in parallel in a parallel paradigm or a distributed computing paradigm in some embodiments. In some other embodiments, the acts 206 and 208 may be performed serially. For example, the act 206 may be performed prior to the performance of the act 208, or the act 208 may be performed prior to the performance of the act 206 in these embodiments. The physical electronic design may then be implemented at 210 (e.g., implementation pursuant to an ECO) with the power intent data determined at 204, the one or more power rules generated at 206, and/or information about the physical domains generated while reducing the usage of one or more computing resources.

Figure 3A:
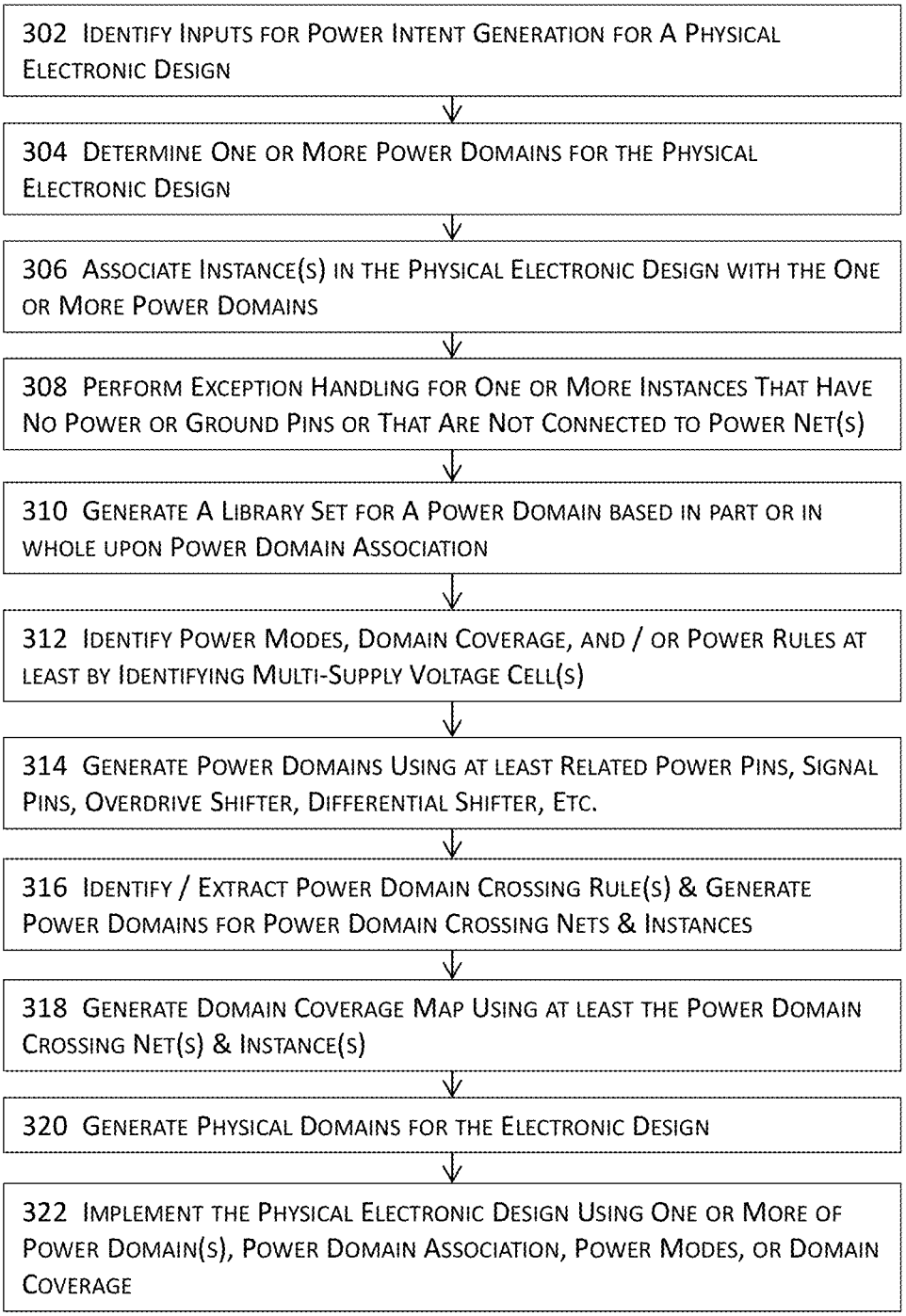
FIG. 3A illustrates a more detailed block diagram for implementing an electronic design with automatically generated power intent in some embodiments.

FIG. 3A illustrates a more detailed block diagram for implementing an electronic design with automatically generated power intent in some embodiments. In these embodiments, one or more inputs may be identified at 302 for automatic power intent generation for a physical electronic design in an identical or substantially similar manner as that described for 202 of FIG. 2. More details about the identification of one or more inputs are described below with reference to FIG. 3B. One or more power domains may be determined at 304 for the physical electronic design. More details about the identification of one or more inputs are described below with reference to FIG. 3C.

With the power domains determined at 304, the instances in the physical electronic design may be associated at 306 with the one or more power domains determined at 304. More details about the identification of one or more inputs are described below with reference to FIG. 3D. Exception handling may be performed at 308 for one or more instances that have no power and/or ground pins, or that are not connected to one or more power nets in some embodiments. In these embodiments, an instance that has no power and/or ground pin, or that is not connected to a power net may be associated with the same power domain of its parent or the power domain with which the portion where the instance is located in the parent is associated.

With the one or more power domains determined and associated with respective instances, a library set may be generated at 310 for a power domain of the one or more determined power domains based in part or in whole upon the association between the power domain and its respective instance(s). In some embodiments, a power domain has or corresponds to a library set that includes libraries or library files to which the one or more corresponding instance associated with the power domain refer. In some embodiments where no libraries or library files correspond to the exactly matching voltage of a power domain of interest, interpolations may be performed between the closest libraries or library files for this power domain of interest. In addition or in the alternative, extrapolations may also be performed from one or more libraries or one or more library files (e.g., a library or library file providing the closest voltage values) for a power domain of interest in some embodiments. Other approximation techniques may also be used to determine the libraries or library files when an exact match between existing libraries or library files and the targeted voltage values do not exist. Therefore, the references to interpolations, extrapolations, or other approximation techniques are not considered as limiting the scope of the claims or the scope of other embodiments, unless otherwise specifically recited in the claims or in these other embodiments.

For example, the entire set of libraries includes the libraries for 1.0V and 0.8V, yet the power domain of interest corresponds to 0.9V operating voltage. In this example, interpolations may be performed between the libraries for 1.0V and 0.8V to determine the corresponding libraries for this power domain of interest. Further, the libraries for 1.0V may be identified into a set of libraries for a power domain of interest having 1.0V operating voltage; and the libraries for 0.8V may be identified into a set of libraries for a power domain of interest having 0.8V operating voltage due to the exact match between the operating voltages of the power domains and that associated with the respective libraries.

Power modes, domain coverage, and/or power rules may be identified or determined at 312 at least by using one or more multi-supply voltage (MSV) cells. A power mode includes one or more combinations of the on and off conditions and the operating voltages of power domains in some embodiments. In some embodiments, a net transmitting a signal from a powered down domain to a powered up domain needs an isolation cell in some embodiments, where a net transmitting a signal from a powered on domain to a powered down domain is permitted with isolation. A multi-supply voltage cell may include multiple power pins and may thus be connected to more than one power domain. In contrast, a regular cell includes a single power pin and may thus be connected to a single power domain.

In these embodiments, isolation may be required or desired due to the potential leakage in signal transmission from a powered down domain to a powered on domain. In some other embodiments, a net transmitting a signal into or out of a powered down domain into another domain having a different power mode needs an isolation cell. In these embodiments, an isolation cell is used to control the behavior of a signal that is driven into or out of a powered down domain to a known state (e.g., "1", "0", or a previous state value).

A level shifter cell or an overdrive shifter cell (e.g., from high to low) creates power modes for crossing power domains. In some embodiments, a level shifter is required or desired for signals transmitted one domain in a low state to another domain in a high state. In the example illustrated in FIG. 4A, a level shifter cell 402A includes an input 404A connected to the input power net in the input power domain 410A (PD_in) and an output 406A connected to the output power domain 412A (PD_out) that is different from the input power domain 410A. The level shifter may be required or desired if signals are transmitted from the input power domain 410A to the output power domain 412A that has a different operating voltage from that of the input power domain 410A.

In some of these embodiments, MSV cells may be identified from one or more inputs identified at 302 for the physical electronic design, and the identification of an MSV cell may indicate and thus result in the identification or generation of power modes. In some other embodiments, power modes may be identified from, for example, the operating voltages from the one or more inputs identified at 302 or from user inputs, and the required or desired MSV cells may be automatically inserted, if these required or desired MSV cells are not already pre-exiting in the electronic design or not identified from the one or more inputs identified at 302. MSV cells other than isolation cells or level shifter cells may also be leveraged at 312.

For example, a state retention cell that restores the cell to a saved value after exiting a shutoff or powered down mode may also be used at 312 in some embodiments. Similarly, always-on cells and power switches may also be identified or used at 312. In some embodiments, isolation cells, state retention cells, always-on cells, and power switches may be identified or inserted, and it may be assumed that their respective outputs may be shut off. In these embodiments, the always-on cells are thus placed in the OFF power domain. In some embodiments, one or more always-on cells (e.g., an always-on buffer) may be identified from the libraries and inserted into a library set of a power domain having placeable standard cell rows. For example, when a first cell is placed at some distance from a second cell with a net in between, an always-on buffer having the always on pin connected to the driver domain and a separate local off pin may be required or desired when the distance between the first and second cells exceeds some threshold.

Domain coverage includes the information that indicates domain crossing that does not require an isolation cell or a level shifter cell in some embodiments. In these embodiments, a first power domain is deemed to cover a second power domain if a net transmitting from the first power domain to the second power domain does not require an isolation cell or a level shifter cell. In some embodiments where a power net is connected to a backup power pin of an isolation and retention cell, the power net connected to the cell (isolation and retention cell) may be assumed to be in a shutoff domain; and the power domain for the enable pin of the isolation and retention cell may be deemed to cover the backup power domain. In some of these embodiments, the backup power domain may not, however, cover the primary power domain.

Figure 4A:
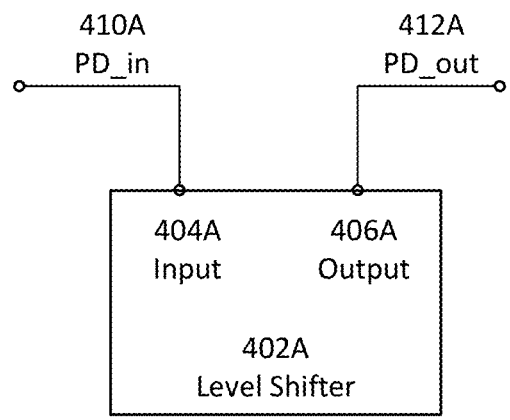
FIGS. 4A-4D illustrate some examples for identification of power domains using multi-supply voltage (MSV) cells in some embodiments.
Figure 4B:
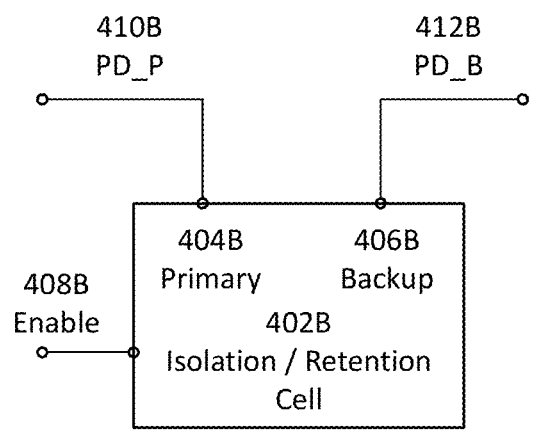

In the example illustrated in FIG. 4B, an isolation and retention cell 402B having a primary power pin 404B in the primary power domain 410B (PD_P), a backup power pin in the backup power domain 412B (PD_B), and an enable pin 408B. In this example, the enable power domain 408B is deemed to cover the backup power domain 412B which in turn covers the primary power domain 410B in some embodiments. As a result, isolation may be required or desired between the primary power domain 410B and the backup power domain 412B.

In some embodiments where a power net is connected to an internal power pin of a power switch, the power switch may be deemed or assumed to be in a shutoff domain. In these embodiments, the primary power domain for the power switch is deemed or assumed to cover the internal power domain of the power switch. In these embodiments, the power domain of the enable pin of the power switch is deemed or assumed to cover the primary power pin or the primary power domain.

Figure 4C:
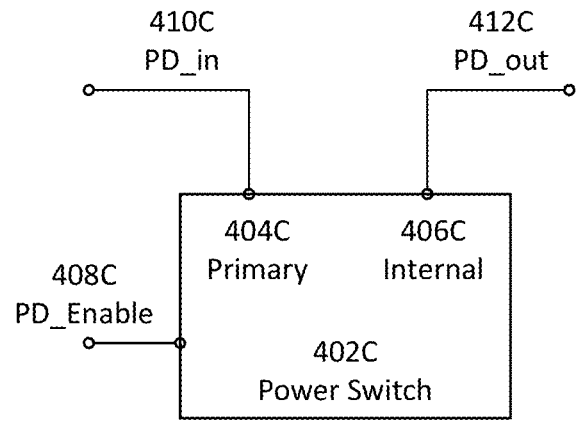
Figure 4D:
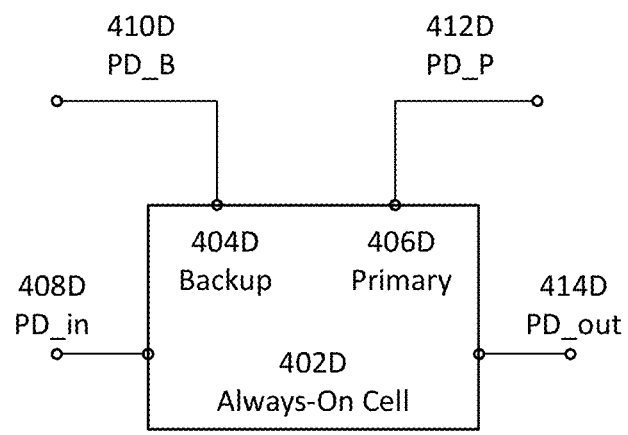

In the example illustrated in FIG. 4C, the power stitch 402C including the primary power pin 404C connected to the primary power net in the primary power domain 410C (PD_in), an internal power pin 406C connected to another net in an output power domain 412C (PD_out), and an enable pin connected to another net in the enable power domain 408C (PD_Enable). As described above, the primary power domain 410C is deemed to cover the output power domain 412C; and the enable power domain 408C is deemed to cover the input power domain 410C. As a result, isolation may be required or desired between the primary power domain 410C and the output power domain 412C in some embodiments.

In some embodiments, the input power domain of an always-on cell is deemed to cover the output power domain; and the backup power domain of the always-on cell is deemed to cover its input power domain. In some of these embodiments illustrated in FIG. 4C, the power switch cell 402C may receive its input 410C from an output of a voltage regulator cell (not shown), and an input to the voltage regulator cell may be at a voltage level while the output feeding the power switch cell 402C at 410C may be at a different voltage level.

Figure 4E:
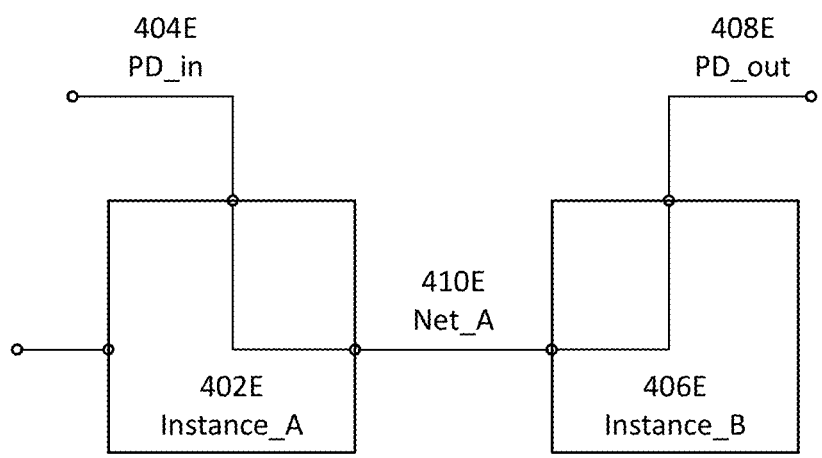
FIGS. 4E and 4G illustrate examples of implementation of a portion of an electronic design using the automatically generated power intent in some embodiments.
Figure 4H:
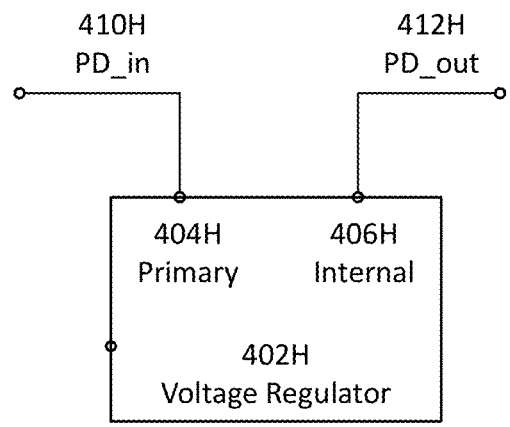
FIG. 4H illustrates an example of a voltage regulator cell whose output may be provided to drive a power switch cell in some embodiments.
Figure 4F:
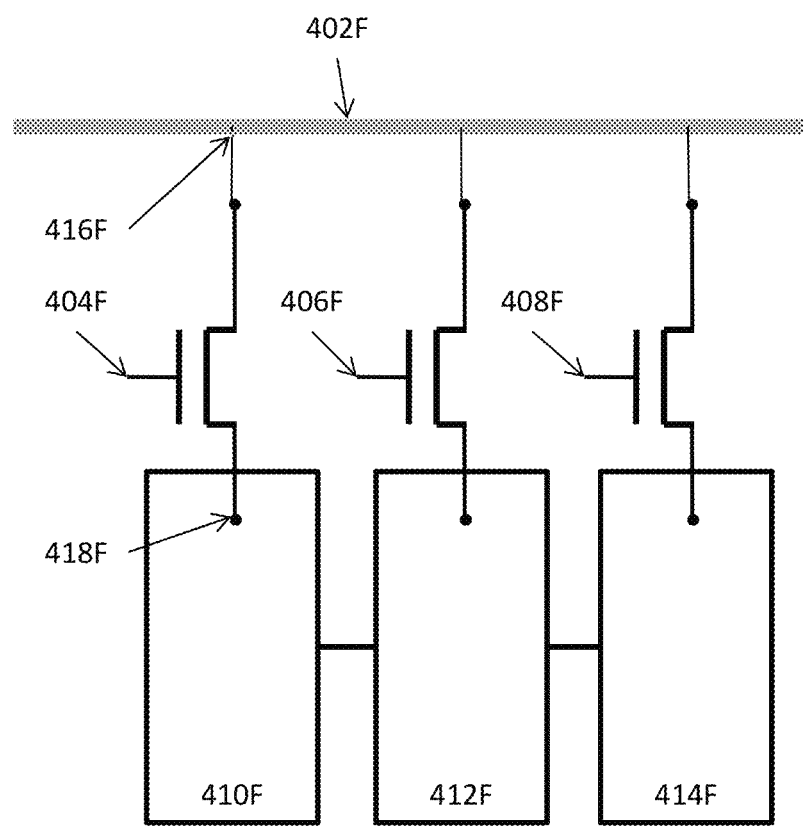
FIG. 4F illustrates an example of implementation of a simplified portion of an electronic design using the automatically generated power intent in some embodiments.

An example of such a voltage regulator cell 402H is illustrated in FIG. 4H. More specifically, this voltage regulator cell example 402H receives an input PD_in (410H) at the primary input pin 404H from one or more first power nets at a first voltage level and outputs PD_out (412H) from the internal power pin 406H. As described above, this output PD_out 412H may be provided to an input pin (e.g., 404C) of a power switch (e.g., 402C). In the example illustrated in FIG. 4D, the always-on cell 402D includes a backup power pin 404D connected to a backup power net in the backup power domain 410D (PD_B) and a primary power pin 406D connected to a primary power net in the primary power domain 412D (PD_P). The always-on cell receives input from an input net in the input power domain 408D (PD_in) and generates outputs to an output net in the output power domain 414D (PD_out).

As described above, the input power domain 408D (PD_in) is deemed to cover the output power domain 414D (PD_out), and the backup power domain 410D (PD_B) is deemed to cover the input power domain 408D (PD_in) in some embodiments. The identification or determination of power modes by identifications or insertions of MSV cells at 312 may be optionally checked for consistency; and conflicting information may be flagged and/or reported for further resolution.

At 314, one or more additional power domains may be generated by using at least one or more related power pins, one or more signal pins, one or more overdrive shifter, and/or one or more differential shifter, etc. A related power pin of a cell have more than one set of power and ground pins includes a power pin that is related to the input pin, the output pin, or both the input and output pins of the cell in some embodiments. For overdrive shifter cells or differential shifter cells, the input signal level may be defined, but the related power pins may not in some embodiments. In these embodiments, the related power domain of the driving pin of an overdrive shifter cell or a differential shifter cell may be identified as the power domain of this pin.

In addition or in the alternative, one or more power domains for one or more power domain crossing nets and/or power domain crossing instances may be generated at 316. One or more power domain crossing rules may also be extracted (if not existing) or identified (if already existing) at 316. These one or more power domain crossing rules may be further referenced at, for example, 318 described below, to generate the domain coverage map with the voltage supply voltage cells. These one or more power domain crossing rules may also be referenced in, for example, a subsequent design implementation process (e.g., an engineering change order or ECO) to guide or control the subsequent design implementation process such that these one or more power domain crossing rules are respected or complied with in the subsequent design implementation process.

A power domain crossing net includes a net whose driving pin and receiving pin belong to different related power domains in some embodiments. In some of these embodiments, a power domain crossing net is permitted when the driving power domain of the driving pin covers the receiving power domain of the receiving pin. In some of these embodiments, the driving power domain may be deemed or assumed to cover the receiving power domain when both instances connected by the power domain crossing net are non-MSV cells.

In some other embodiments, a power domain crossing net may also be permitted when there exists a non-dedicated isolation cell having only one primary power pin but no backup power pin between the driving and receiving power domains. In the example illustrated in FIG. 4E, signals may be transmitted from the first instance 402E (Instace_A) to the second instance 406E (Instance_B) via the net 410E (Net_A). Net_A is identified as a domain crossing net when the first power domain 404E (PD_in) and the second power domain 408E (PD_out) have different voltages. The Net_A is permitted in some embodiments when the first power domain 404E covers the second power domain 408E as illustrated in FIG. 4E.

A domain crossing instance includes an instance whose input and output have different related power domains in some embodiments. That is, domain crossing occurs within the domain crossing instance. Some examples of domain crossing cells include some isolation cells, some level shifter cells, some power switch cells, voltage regulator cells, any combinations of one or more power switch cells and one or more voltage regulator cells, and some macro cells.

A power domain coverage map may be generated at 318 by using at least one or more power domain crossing nets and/or one or more power domain crossing instances. In some of these embodiments, the generation of a power domain coverage map may also reference one or more power domain crossing rules. FIG. 5A illustrates an example of a power domain coverage map in some embodiments. It shall be noted that although FIG. 5A is represented in a tabular data structure, a power domain coverage map may be represented in any other suitable formats or data structures. In the example illustrated in FIG. 5A, the data structure may be optionally initialized to assume that no domains cover other domains. With the techniques described in FIG. 3A, the power domain coverage map may be populated with corresponding entries indicative of whether one power domain covers another power domain.

For example, the entry corresponding to the third row ("PD_en") and the fifth column ("PD_B") and having the value or symbol "O" indicates that the power domain "PD_en" covers the power domain "PD_B". It shall be noted that the diagonal entries in this example all have the value or symbol "O" because a domain always covers itself. With a power domain coverage map such as the one illustrated in FIG. 5A, whether one domain covers another domain may be easily looked up. In addition, for any fields in FIG. 5 that do not have the value or symbol "O", these fields correspond to negative domain coverage. For example, the absence of the value or symbol "O" in the field corresponding to (PD_in, PD_P) indicates that PD_in does not cover PD_P.

The power domain coverage map may thus guide the implementation of electronic designs to determine whether a special cell (e.g., an MSV cell) may be needed. For example, whether the first power domain covers the second power domain may be quickly looked up from a power domain coverage map such as the one illustrated in FIG. 5A. If the power domain coverage map indicates that the first power domain does not cover the second power domain, a special cell (e.g., an isolation cell, a level shifter cell, a state retention cell, a power switch, an always-on cell, etc.) may be required or desired between the first and second power domains.

Physical domains or physical domain boundaries for the one or more power domains may also be generated at 320 by using, for example, physical information such as the global power grid, power rails on metal 1 (M1), power stripes, and/or standard cell rows that may be identified from the physical electronic design in some embodiments. In some embodiments where the physical domain boundaries are unavailable, the physical power domain boundaries may be alternatively generated by tracing power nets and connected wires or interconnects including, for example, power pin shapes in abutted standard cells.

Figure 5B:
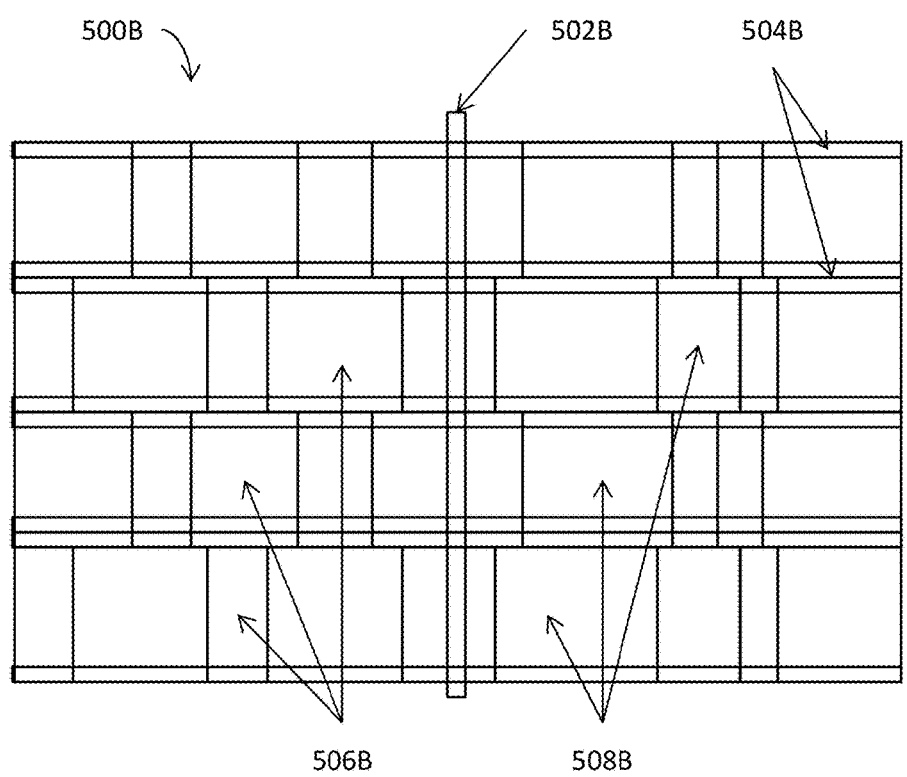
FIG. 5B illustrates an example of physical domain boundaries that are generated with some techniques described herein for an electronic design and may be used in implementation of the electronic design in some embodiments.

In some of these embodiments, power nets that are not connected to standard cells may not have domain boundary, and thus subsequent implementation of the physical electronic design (e.g., implementation via an ECO process) may not be possible in the domains or regions associated with these power nets. FIG. 5B illustrates an example of physical domain boundaries that are generated with some techniques described herein for an electronic design and may be used in implementation of the electronic design in some embodiments. In this example, the physical boundaries of power domains may include, for example, the global power grid 502B, the power rails 504B, and cell rows 506B where the rectangles 508B represent cells.

At 322, the physical electronic design may be implemented by using one or more of the one or more identified power domains, the power domain associations, the power modes, and/or the domain coverage information or map in some embodiments. With the automatically generated power intent (e.g., those one or more of the one or more identified power domains, the power domain associations, the power modes, and/or the domain coverage information or map, etc. described herein), implementations of a physical electronic design at 322 (or 210 of FIG. 2) may be accomplished while ensuring that one or more requirements or constraints related to the automatically generated power intent are satisfied to reduce or eliminate errors due to possible violations of at least some of the automatically generated power intent, to improve the time-to-market or design cycle time, and/or to reduce the use of one or more computing resources. For example, an implementation of a physical electronic design may require a shorter computer program run time due to fewer violations to check and/or fix or fewer properties to verify or validate in physical verification, a fewer number of iterations due to elimination or reduction of errors or violations of power intent and/or the association of power intent related information, characteristics, or properties with an electronic design of interest, a smaller memory footprint due to a fewer number requirements or constraints or a smaller rule deck to check, and/or less time for design checking, verification, debugging, fixing, iteration, and/or signoff due to fewer errors or violations of power intent, etc. Another advantage of various embodiments described herein is the availability of power intent that is automatically extracted or generated with various techniques described herein during physical design implementation stages (e.g., layout generation, layout editing, layout optimization, engineering change order, etc.) or even during post-layout stages (e.g., physical verification, signoff, etc.) in some embodiments. In these embodiments, even when the power intent is never made available to a physical design engineer, various techniques automatically generate power intent that may be provided to the physical design engineer to implement the physical electronic design (e.g., a layout). In addition or in the alternative, power intent is automatically generated from an electronic design with various techniques described herein without any transformation, mapping, conversion, translation, or further processing of, for example, power intent in a standard power format in another design abstraction level (e.g., the design specification level, the schematic level, etc.)

Figure 4G:
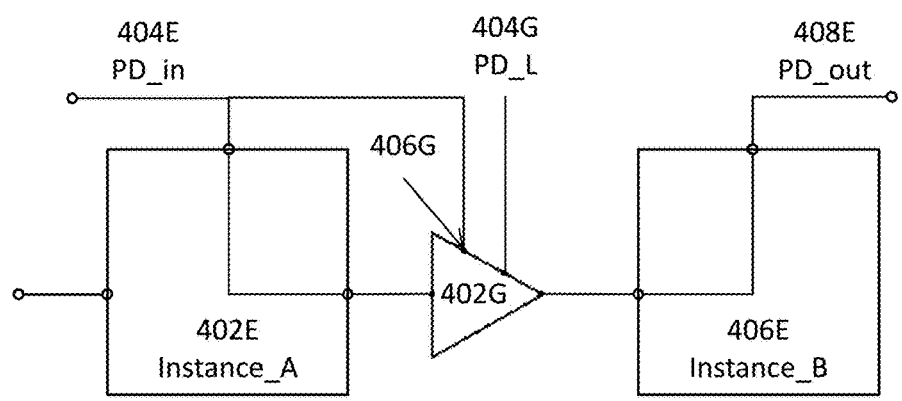

FIG. 4G illustrates an example of implementation of a portion of an electronic design using the automatically generated power intent in some embodiments. More specifically, FIG. 4G illustrates a portion of the electronic design illustrated in FIG. 4E for which subsequent implementations may be performed. Subsequent implementations may include, for example, any editing, modifications, improvements, or optimizations of the underlying physical electronic design such as a layout editing or modification pursuant to an ECO or a layout optimization process. In this example, a buffer is inserted along Net_A 410E (in FIG. 4E).

In some embodiments with the power modes determined as described in FIGS. 2 and 3A, the addition of a buffer along a power domain crossing net may be permitted in addition to the addition or sizing of a buffer in the same power domain so long as the power rules described herein are observed. The addition of a buffer in a power domain that is different from the driving power domain (e.g., PD_in 404E) may thus require or desire an always-on cell. In this example illustrated in FIG. 4G, an always-on buffer 402G is inserted between the first instance 402E (Instance_A) and the second instance 406E (Instance_B). Because buffering is inserted to the power domain PD_L 404G, this buffering requires an always-on cell (e.g., 402G) because the buffer is inserted in a power domain (404G) different from the driving power domain (404E). If the first power domain 404E (PD_in) does not cover the power domain 404G (PD_L), or the power domain 404G (PD_L) does not cover the second power domain 408E (PD_out), the always-on cell 402G may be required, and the backup power pin may be connected to the first power domain 404E (PD_in) as illustrated in FIG. 4G.

Figure 3B:
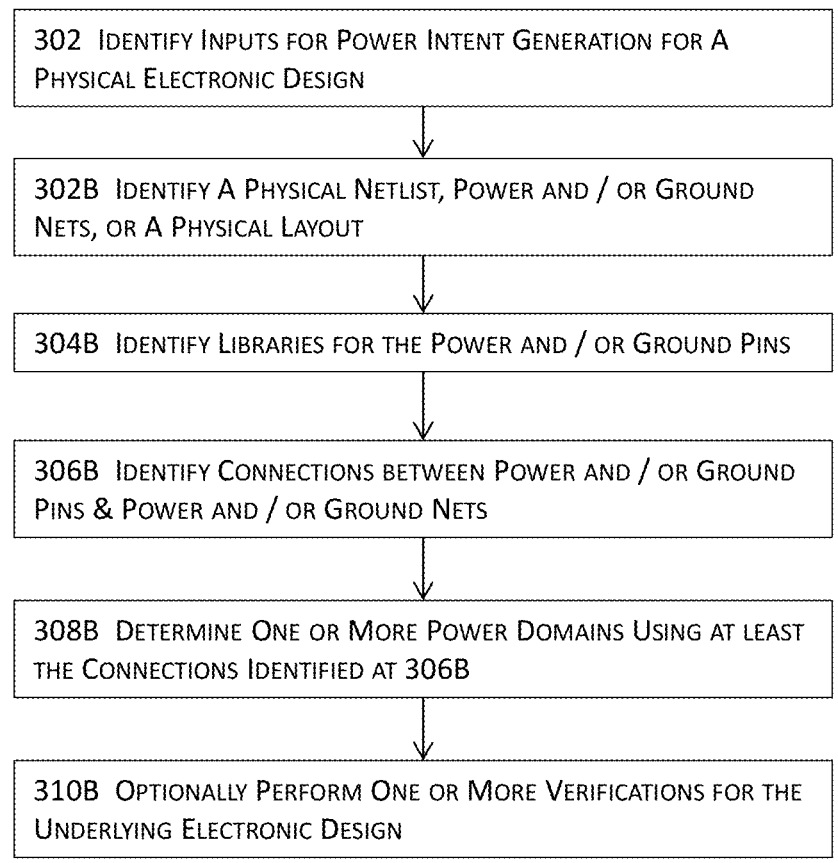
FIG. 3B illustrates a more detailed block diagram for a part of the block diagram for implementing an electronic design with automatically generated power intent illustrated in FIG. 3A in some embodiments.

FIG. 3B illustrates a more detailed block diagram for a part of the block diagram for implementing an electronic design with automatically generated power intent illustrated in FIG. 3A in some embodiments. More specifically, FIG. 3B illustrates a more detailed block diagram for the act 302 of identifying one or more inputs in FIG. 3A. In these embodiments, a physical netlist and/or a physical layout may be identified at 302B. In some embodiments, any sources that may provide the power and/or ground pins and connections therefor (e.g., one or more power nets and/or one or more ground nets) may be identified at 302B, and a physical netlist or a physical layout is just an example of such sources.

From the physical netlist or the physical layout, the power and/or ground pins may also be identified at 302B. Libraries for the power pins may be identified at 304B by selecting the libraries with matching voltages for the power pins or by performing interpolations between two libraries when there exist no libraries with matching voltages for a power pin as described above with reference to FIG. 3A. Connections to and/or from the power and/or ground pins may be identified at 306B. In addition or in the alternative, power and/or ground nets may be identified at 306B. One or more power domains may then be determined at 308B by using at least the identified connections and/or power and/or ground nets.

In some of these embodiments, the one or more power domains may be determined at 308B by using at least identified connections and/or the power and/or ground nets together with the voltage information (e.g., the primary voltages at the nodes where instances are connected to the power rails or voltage regulators as described above). With the voltage information and the connections and/or the power and/or ground nets, the power domains may be determined accordingly. At 310B, one or more verifications (e.g., layout-versus-schematic or LVS, equivalence checking such as formal equivalence checking, and/or other formal verification tasks, etc.) may be optionally performed to prove or disprove the correctness of the underlying electronic design or the properties thereof.

Figure 3C:
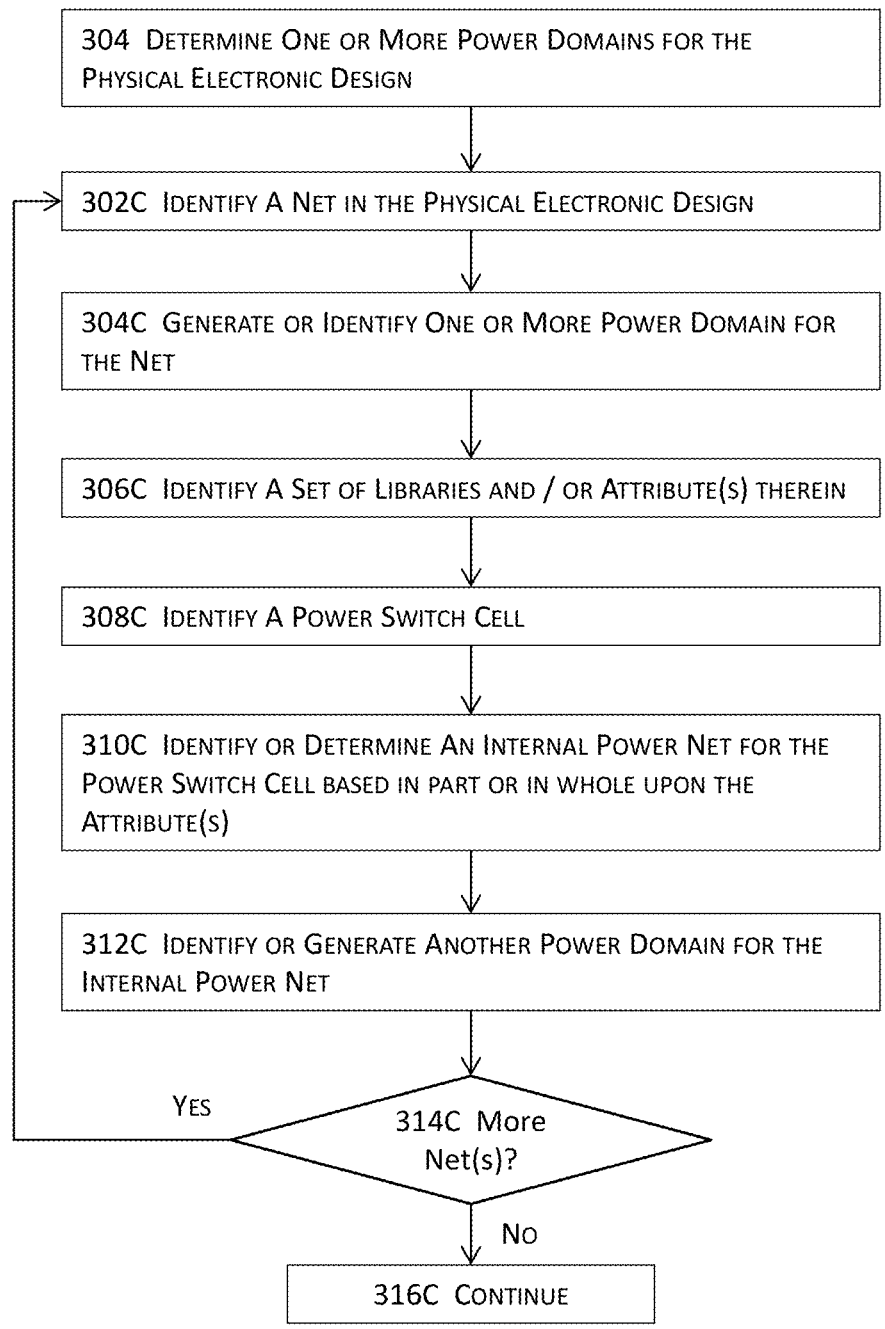
FIG. 3C illustrates a more detailed block diagram for a part of the block diagram for implementing an electronic design with automatically generated power intent illustrated in FIG. 3A in some embodiments.

FIG. 3C illustrates a more detailed block diagram for a part of the block diagram for implementing an electronic design with automatically generated power intent illustrated in FIG. 3A in some embodiments. More specifically, FIG. 3C illustrates a more detailed block diagram for the act 304 of determining one or more power domains in FIG. 3A. In these embodiments, a net of a plurality of nets may be identified at 302C from the physical electronic design. The net (e.g., a power net including one or more internal power nets) may be identified from the connectivity information including, for example, the physical net list in some embodiments.

The net may also be identified from the physical electronic design in some other embodiments. One or more power domains may be generated or identified at 304C for the identified net. For example, the one or more power domain for the identified net may be generated or identified by referencing the voltage (e.g., the primary voltage at the node where the net is connected to a power rail or a voltage regulator). The one or more power domains may further be identified or generated with the identification of one or more multi-voltage cells along the net using the techniques described above with reference to FIGS. 2 and 3A. In some embodiments, one or more power domains are created or identified for each power net that may include one or more internal power nets.

These one or more internal power nets may be identified through power switches. With these one or more power domains identified, a set of libraries and/or one or more attributes for each power domain may be identified at 306C. These one or more attributes of the set of libraries may include information such as the functionality of one or more cells, etc. In some embodiments, each library includes or is associated with a set of libraries to which one or more instances in the power domain reference. For example, the set of libraries may be selected from the entire set of libraries by matching the operating voltage of a power domain and the referenced voltage in the libraries or by interpolating libraries the operating voltage of a power domain does not exactly match the referenced voltages in the libraries.

As described immediately above, internal power nets may be identified through power switches in some embodiments. In these embodiments, a power switch cell, a voltage regulator cell, or a combination of a power switch cell and a voltage regulator cell may be identified at 308C based in part or in whole upon the one or more attributes or the set of libraries identified at 306C. An internal power net may then be identified at 310C for the power switch cell, the voltage regulator cell, or a combination of the power switch cell and the voltage regulator cell by using at least some information about the identified power switch cell, the identified voltage regulator cell, or the identified combination of the power switch cell and the voltage regulator cell at 308C, and one or more internal power nets may be identified or determined at 310C for the power switch cell, the voltage regulator cell, or the combination of the power switch cell and the voltage regulator cell based in part or in whole upon the one or more attributes of the identified power switch cell, the identified voltage regulator cell, or the identified combination of the power switch cell and the voltage regulator cell.

The voltage information from the one or more inputs identified at, for example, 302, and/or the input logic of the identified power switch cell, the identified voltage regulator cell, or the identified combination of the power switch cell and the voltage regulator cell may then be used to identify or determine one or more internal power domains for an internal power net of the identified power switch cell, the identified voltage regulator cell, or the identified combination of the power switch cell and the voltage regulator cell in some embodiments. For example, one or more attributes of a power switch cell, a voltage regulator cell, or a combination of a power switch cell and a voltage regulator cell may be used to identify internal net(s). More specifically, a power switch cell (a voltage regulator cell or a combination of the power switch cell and the voltage regulator cell) may include a primary power input pin connected to the primary input power (e.g., from a power rail or a voltage regulator) in the primary input power domain. The power switch cell, the voltage regulator cell, or the combination of the power switch cell and the voltage regulator cell may also include an internal power pin to supply internal power to an internal net subject to an enable signal transmitted from, for example, an input logic module to the power switch cell via a switch pin from an enable net.

One or more attributes of a power switch cell (or a voltage regulator cell or a combination of the power switch cell and the voltage regulator cell) including, for example, the primary input power domain of the power switch cell, the voltage regulator cell, or the combination of the power switch cell and the voltage regulator cell, the output and/or the logic of the input logic module, and/or analysis results of the input logic module, etc. may be identified for the identified power switch cell, the identified voltage regulator cell, or the identified combination of the power switch cell and the voltage regulator cell. These one or more attributes of the power switch cell (or the voltage regulator cell or the combination of the power switch cell and the voltage regulator cell) may be used to identify or determine one or more internal power nets based in part upon the connectivity information. For each internal power net, one or more power domains (e.g., one or more internal power domains) may be similarly identified or generated by using identical or similar techniques as those described in 304C or FIG. 3A. A determination may be made at 314C to decide whether there exist one or more nets to process. If the determination is affirmative, the flow may return to 302C to identify another net and repeat the acts 302C through 314C until all nets, all power nets, or all power nets including internal power nets are processed. Otherwise, the flow continues to 316C to continue the flow illustrated in FIG. 3C.

Figure 3D:
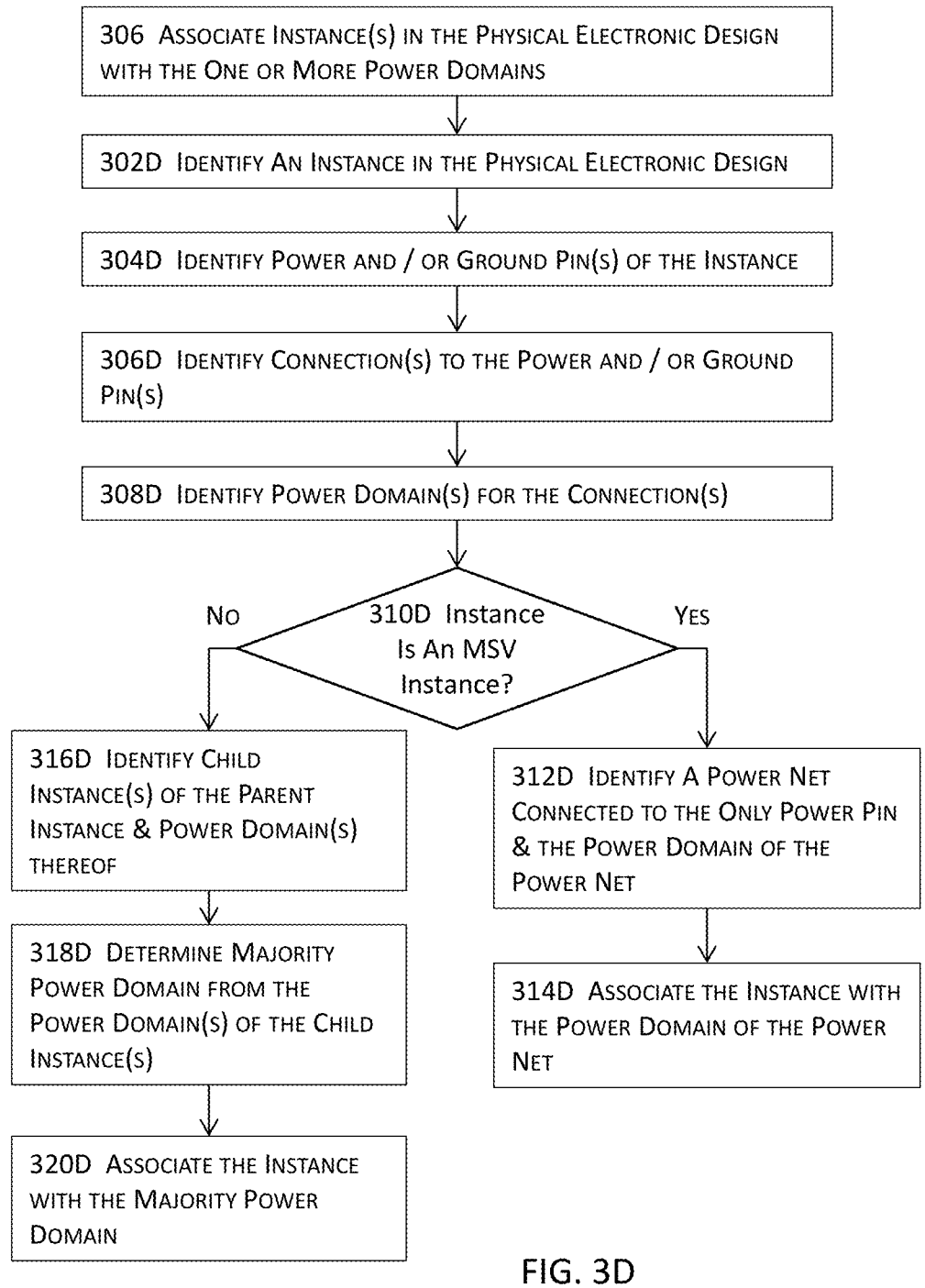
FIG. 3D illustrates a more detailed block diagram for a part of the block diagram for implementing an electronic design with automatically generated power intent illustrated in FIG. 3A in some embodiments.

FIG. 3D illustrates a more detailed block diagram for a part of the block diagram for implementing an electronic design with automatically generated power intent illustrated in FIG. 3A in some embodiments. More specifically, FIG. 3D illustrates a more detailed block diagram for the act 306 of associating one or more instances in the physical design electronic design with their respective power domains identified or created in 304 in FIG. 3A. In these embodiments, an instance may be identified from the physical electronic design at 302D. The power pins of the instance may further be identified at 304D for the identified instance.

In some embodiments, both the power pins and the ground pins may be identified at 304D by using, for example, connectivity information. Connections to and/or from each of the power pins and/or the ground pins may be identified at 306D. In some embodiments, these connections include, for example, one or more nets running into and/or out of the identified instance may be identified at 306D. In some embodiments, all nets running into and/or out of the identified instance may be identified. In some other embodiments, only the power net(s) and/or the ground net(s) running into and/or out of the identified instance will be identified at 306D.

One or more power domains for the identified connections may be identified at 308D by using identical or similar techniques as those described above with reference to FIGS. 2-3C. It may be further determined whether the instance identified at 302D is an MSV (multi-supply voltage) cell instance having more than one power pin at 310D. If the determination is affirmative, the flow may proceed to 312D to identify a power net that is connected to the only power pin as well as the power domain of the power net. The power domain may then be associated at 314D with the instance identified at 302D. If the determination at 310D is negative, one or more child instances, if any, of the parent instance identified at 302D may be identified at 316D for the identified instance by, for example, examining the hierarchical structure of the physical electronic design. In some of these embodiments where a multi-supply voltage cell instance is identified at 302D, all the child instances within the design hierarchy of the identified multi-supply voltage cell instance may be identified at 316D.

One or more child power domains of these one or more child instances may be identified, and the majority power domain may be identified from these one or more child power domains at 318D. The instance identified at 302D may then be associated with the majority power domain at 320D. A tie-breaker mechanism may be utilized to determine the majority power domain in the event of a tie between or among multiple child power domains. The tie-breaker mechanism may use information or data such as the power intent data, the design specification, and/or the intended functionality of the underlying electronic design to identify the majority power domain from these multiple child power domains in some embodiments. This flow illustrated in FIG. 3D may be repeated for all instances in the physical electronic design so that each instance is associated with a power domain in some embodiments.

Figure 3E:
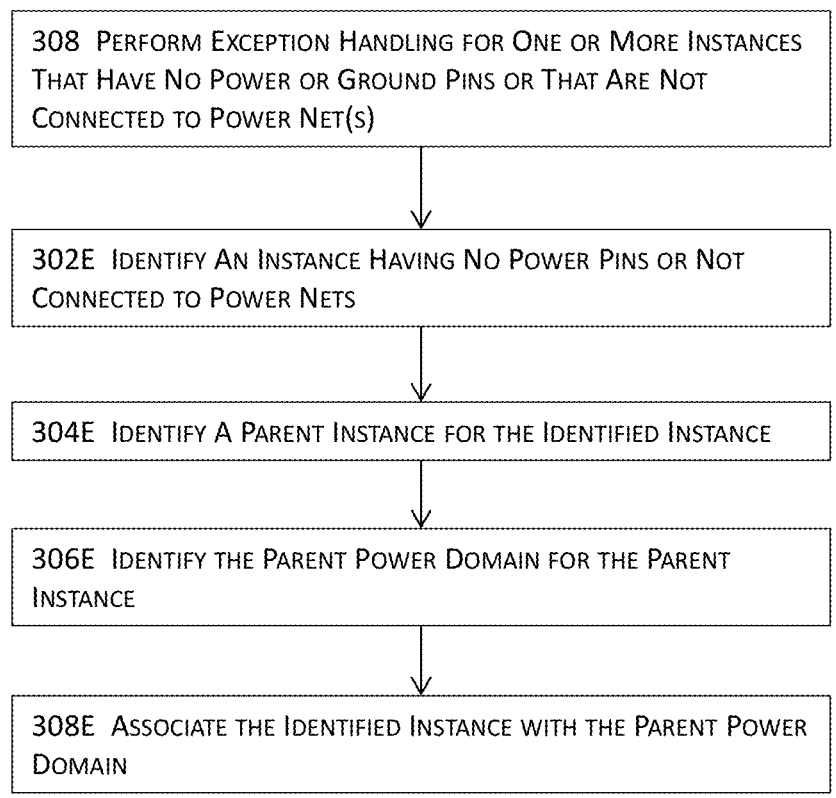
FIG. 3E illustrates a more detailed block diagram for a part of the block diagram for implementing an electronic design with automatically generated power intent illustrated in FIG. 3A in some embodiments.

FIG. 3E illustrates a more detailed block diagram for a part of the block diagram for implementing an electronic design with automatically generated power intent illustrated in FIG. 3A in some embodiments. More specifically, FIG. 3E illustrates a more detailed block diagram for the act 308 of performing exception handling in FIG. 3A. In these embodiments where an instance has no power pins or is not connected to any power nets, the power domain(s) with which the parent instance of the instance is associated may be associated with the instance. In these embodiments, an instance that has no power pins, or that is not connected to any power nets may be identified at 302E. A parent instance of the instance identified at 302E may be further identified at 304E. One or more power domains of the parent instance may be identified at 306E, and these one or more power domains associated with the parent instance may be associated at 308E with the instance identified at 302E. In some embodiments where an identified instance has no parent instance, the instance or the region occupied by the instance in the physical electronic design may be excluded from subsequent implementations.

Figure 3F:
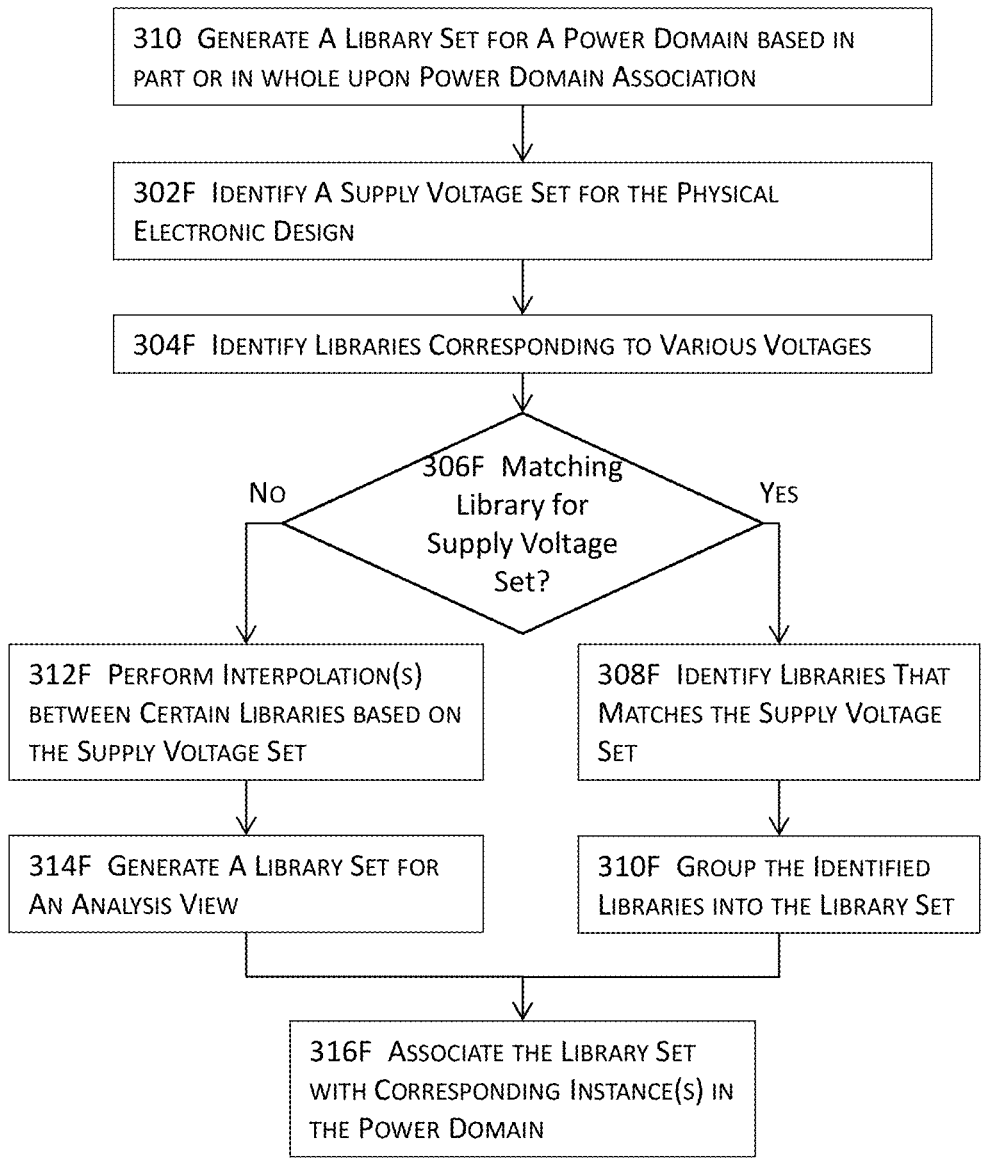
FIG. 3F illustrates a more detailed block diagram for a part of the block diagram for implementing an electronic design with automatically generated power intent illustrated in FIG. 3A in some embodiments.

FIG. 3F illustrates a more detailed block diagram for a part of the block diagram for implementing an electronic design with automatically generated power intent illustrated in FIG. 3A in some embodiments. More specifically, FIG. 3F illustrates a more detailed block diagram for the act 310 of generating a library set in FIG. 3A. In these embodiments, a supply voltage set may be identified at 302F for the physical electronic design. In some of these embodiments, a supply voltage set includes information of at least some known voltage values of the underlying physical electronic design. For example, a supply voltage set may include voltage values at a plurality of nodes in the underlying electronic design.

A supply voltage set may further include polarity information of at least some voltages in the underlying electronic design. A supply voltage set may further include other annotations such as symbols to indicate voltage rises (e.g., voltage rises from sources of EMF or electromotive force) as well as voltage drops (e.g., voltage drop across a resistor caused by Ohm's law) or any other terminology, symbols, or annotations that are compatible with other EDA tools (e.g., simulators, analysis tools, or design implementation tools, etc.) It shall be noted that a supply voltage set may be stored in any data structures or even as unstructured data. With the information about the at least some voltages in the underlying physical electronic design, libraries corresponding to these voltage values may be identified at 304F.

A determination may be made at 306F to decide whether there exist libraries corresponding to a voltage value that exactly matches a voltage value (e.g., an operating voltage of a cell) in the supply voltage set. If the determination is affirmative, the libraries corresponding to the matching voltage value may be identified at 308D, and these identified libraries may be grouped into a set of libraries at 310D for the power domain having the voltage value. Otherwise, one or more interpolations or other types of approximations (e.g., curve fitting) may be performed at 312F on libraries corresponding to non-matching voltage values for the voltage value in the voltage map to generate the libraries, at 314F, for circuit components (e.g., cells, blocks, or individual components, etc.) in a power domain having the voltage value or for analysis views corresponding to the voltage value. The library set generated at 310F or 314F may then be associated with the power domain at 316F.

System Architecture Overview

Figure 6:
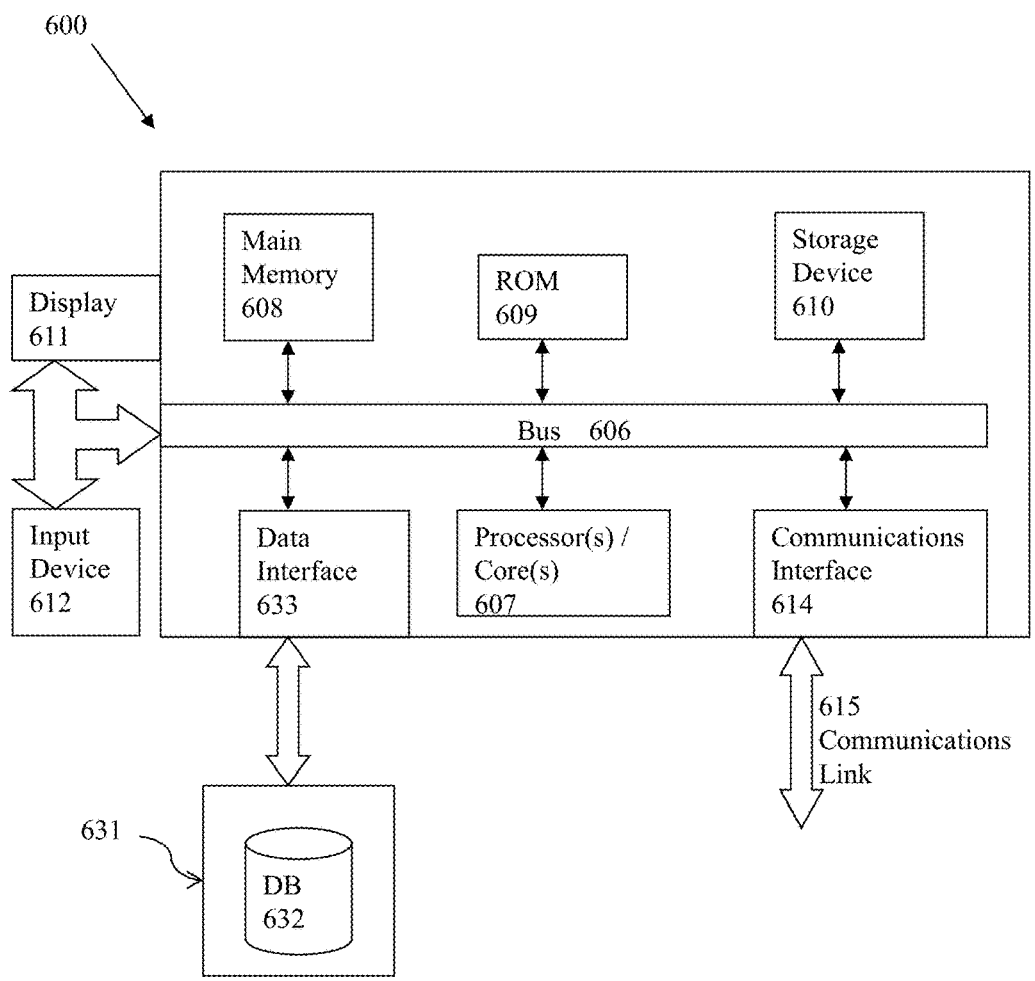
FIG. 6 illustrates a computerized system on which a process for implementing an electronic design with automatically generated power intent may be implemented.

FIG. 6 illustrates a block diagram of a simplified illustration of a computing system 600 suitable for FIG. 6 illustrates a computerized system on which a method for implementing a multi-fabric mixed-signal electronic design spanning across multiple design fabrics with electrical and/or thermal analysis awareness as described in the preceding paragraphs with reference to various figures. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the act of extracting, the act of determining, the act of representing, the act of generating, the act of performing one or more analyses, etc. may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing an electronic design with automatically generated power intent, comprising:

identifying, at a physical electronic design implementation module including or functioning in conjunction with the one or more microprocessors and at least partially stored in a non-transitory computer readable storage medium, one or more inputs for power intent generation for an electronic design;

generating and storing power intent into a data structure comprising a first sub-structure including a plurality of power domains in the electronic design and a second sub-structure including respective domain coverage information for the plurality of power domains for the electronic design, by using at least one or more power related characteristics determined from at least the one or more inputs for the power intent; and reducing computing resource utilization at least by reducing a set of constraints or requirements into a reduced set based at least in part on at least some of the respective domain coverage information and further by guiding an implementation of the electronic design stored in a database structure with at least the power intent, wherein guiding the implementation comprises:
  determining, at a placement and routing engine stored at least partially in memory and functioning in conjunction with the one or more microprocessors, routing for and a need for a special cell between a first instance and a second instance based in part or in whole upon the power intent; and
  verifying, at a verification engine stored at least partially in the memory and functioning in tandem with the one or more microprocessors, the implementation against the reduced set stored in the memory.

2. The computer implemented method of claim 1, wherein the one or more inputs comprising connectivity information and a data structure storing therein voltage information for the electronic design, and the electronic design is associated with or has no, incomplete, or incorrect power intent data prior to generation of the power intent.

3. The computer implemented method of claim 1, the act of identifying the one or more inputs comprising:
  identifying connectivity information including at least a physical netlist or a layout from a data store;
  identifying a plurality of power pins and/or a plurality of ground pins from the connectivity information;
  identifying a number of libraries for at least one power pin from a reference set of libraries based in part or in whole upon the physical netlist or the layout; and
  identifying a plurality of connections running to and/or from the plurality of power pins and/or the plurality of ground pins.

4. The computer implemented method of claim 3, the act of identifying the one or more inputs comprising:
  extracting voltage information for the at least one power pin from a data structure; and
  determining one or more power domains using at least the plurality of connections and the voltage information.

5. The computer implemented method of claim 1, the act of generating the power intent further comprising:
  determining one or more power domains for the electronic design; and
  associating one or more instances in the electronic design with the one or more power domains.

6. The computer implemented method of claim 5, determining the one or more power domains further comprising:
  identifying a net in the electronic design at least by examining the one or more inputs comprising connectivity information that further includes at least a physical netlist or a layout of the electronic design; and
  determining the one or more power domains for the net at least by identification of one or more multi-voltage cells or blocks and a reference to a voltage value at a node along the net.

7. The computer implemented method of claim 5, determining the one or more power domains further comprising:
  identifying at least one cell of a power switch cell, a voltage regulator cell, or a combination of the power switch cell and the voltage regulator cell connected to the net;
  identifying one or more attributes of a set of libraries referenced by the at least one cell;
  identifying one or more internal nets for the at least one cell based in part or in whole upon the one or more attributes; and
  generating one or more internal power domains for the one or more internal nets at least by the identification of the one or more multi-voltage cells or blocks and the reference to the voltage value at the node along the net.

8. The computer implemented method of claim 5, associating the one or more instances in the electronic design with the one or more power domains further comprising:
  identifying an instance in the electronic design at least by examining the one or more inputs comprising connectivity information that further includes at least a physical netlist or a layout of the electronic design;
  identifying at least one power pin and/or at least one ground pin of the instance based in part or in whole upon the connectivity information; and
  identifying one or more connections to and/or from the at least one power pin and/or the at least one ground pin.

9. The computer implemented method of claim 8, associating the one or more instances in the electronic design with the one or more power domains further comprising:
  determining one or more first power domains for the one or more connections; and
  determining whether the instance includes only the at least one power pin and no other power pins.

10. The computer implemented method of claim 9, associating the one or more instances in the electronic design with the one or more power domains further comprising:
  identifying a power net connected to the at least one power pin and a first power domain of the power net when the instance includes only the at least one power pin; and
  associating the instance with the first power domain of the power net.

11. The computer implemented method of claim 5, further comprising: generating a set of libraries for a power domain of the one or more power domains.

12. The computer implemented method of claim 11, further comprising:
  identifying a supply voltage set for the electronic design and voltage information from or associated with the power domain;
  identifying available libraries for the electronic design; and
  determining whether one or more voltage values in the available libraries match the voltage information from or associated with the power domain.

13. The computer implemented method of claim 11, further comprising:
  identifying the one or more libraries into the set of libraries for the power domain when the one or more voltage values in the one or more libraries match the voltage information from or associated with the power domain; and
  associating the set of libraries with the power domain.

14. The computer implemented method of claim 11, further comprising:
  performing one or more interpolations, extrapolations, or approximations between or among a plurality of libraries based in part or in whole upon the voltage information from or associated with the power domain when the no voltage values in the plurality of libraries match the voltage information from or associated with the power domain;
  generating the set of libraries for the power domain that corresponds to the voltage information that does not match any voltage values in the available libraries; and
  associating the set of libraries with the power domain.

15. The computer implemented method of claim 1, further comprising:
performing exception handling for at least one instance located in the electronic design.

16. The computer implemented method of claim 11, further comprising:
identifying the at least one instance by determining whether the at least one instance has no power or ground pins or is not connected to power nets;
identifying a parent instance for the at least one instance;
identifying the parent power domain for the parent instance; and
associating the parent power domain with the at least one instance.

17. An article of manufacture comprising a non-transitory computer accessible storage medium having stored thereupon a sequence of instructions which, when executed by one or more microprocessors or at least one processor core executing one or more threads, causes the one or more microprocessors or the at least one processor core to perform a set of acts for implementing an electronic design with automatically generated power intent, the set of acts comprising:
identifying, at a physical electronic design implementation module including or functioning in conjunction with the one or more microprocessors and at least partially stored in a non-transitory computer readable storage medium, one or more inputs for power intent generation for an electronic design;
generating and storing power intent into a data structure comprising a first sub-structure including a plurality of power domains in the electronic design and a second sub-structure including respective domain coverage information for the plurality of power domains for the electronic design, by using at least one or more power related characteristics determined from at least the one or more inputs for the power intent; and
reducing computing resource utilization at least by reducing a set of constraints or requirements into a reduced set based at least in part on at least some of the respective domain coverage information and further by guiding an implementation of the electronic design stored in a database structure with at least the power intent, wherein guiding the implementation comprises:
determining, at a placement and routing engine stored at least partially in memory and functioning in conjunction with the one or more microprocessors, routing for and a need for a special cell between a first instance and a second instance based in part or in whole upon the power intent; and
verifying, at a verification engine stored at least partially in the memory and functioning in tandem with the one or more microprocessors, the implementation against the reduced set stored in the memory.

18. The article of manufacture of claim 17, the set of acts comprising generating the power intent that further comprises:
determining one or more power domains for the electronic design; and
associating one or more instances in the electronic design with the one or more power domains.

19. The article of manufacture of claim 18, the set of acts further comprising:
identifying a net in the electronic design at least by examining the one or more inputs comprising connectivity information that further includes at least a physical netlist or a layout of the electronic design; and
determining the one or more power domains for the net at least by identification of one or more multi-voltage cells or blocks and a reference to a voltage value at a node along the net.

20. The article of manufacture of claim 18, the set of acts further comprising:
identifying at least one cell of a power switch cell, a voltage regulator cell, or a combination of the power switch cell and the voltage regulator cell connected to the net;
identifying one or more attributes of a set of libraries referenced by the at least one cell;
identifying one or more internal nets for the at least one cell based in part or in whole upon the one or more attributes; and
generating one or more internal power domains for the one or more internal nets at least by identification of one or more multi-voltage cells or blocks and a reference to a voltage value at a node along the net.

21. A system for implementing an electronic design with automatically generated power intent, comprising:
non-transitory computer accessible storage medium storing thereupon program code;
a physical electronic design implementation module that includes or functions in conjunction with the one or more microprocessors, is at least partially stored in a non-transitory computer readable storage medium, and is configured to identify one or more inputs for power intent generation for an electronic design;
one or more microprocessors that are coupled to the physical electronic design implementation module and are configured to execute the program code to generate and store power intent into a data structure comprising a first sub-structure including a plurality of power domains in the electronic design and a second sub-structure including respective domain coverage information for the plurality of power domains for the electronic design by using at least one or more power related characteristics determined from at least the one or more inputs for the power intent; and
one or more microprocessors that are coupled to the physical electronic design implementation module and are configured to execute the program code to reduce computing resource utilization at least by reducing a set of constraints or requirements into a reduced set based at least in part on at least some of the respective domain coverage information and further by guiding an implementation of the electronic design stored in a database structure with at least the power intent, wherein the one or more microprocessors that are coupled to the physical electronic design implementation module and are configured to execute the program code to reduce the computing resource utilization are further configured to execute the program code to:
determine, at a placement and routing engine stored at least partially in memory and functioning in conjunction with the one or more microprocessors, routing for and a need for a special cell between a first instance and a second instance based in part or in whole upon the power intent; and
verify, at a verification engine stored at least partially in the memory and functioning in tandem with the one or more microprocessors, the implementation against the reduced set stored in the memory.

22. The system for claim 21, wherein the physical electronic design implementation module is further configured to identify connectivity information including at least a physical netlist or a layout from a data store, to identify a plurality of power pins and/or a plurality of ground pins from the connectivity information, to identify a number of libraries for at least one power pin from a reference set of libraries based in part or in whole upon the physical netlist or the layout, and to identify a plurality of connections running to and/or from the plurality of power pins and/or the plurality of ground pins.

23. The system for claim 21, wherein the one or more microprocessors that are to generate the power intent is further configured to determine one or more power domains for the electronic design, and to associate one or more instances in the electronic design with the one or more power domains.

24. The system for claim 21, wherein the one or more microprocessors that are to associate the one or more instances in the electronic design with the one or more power domains is further configured to identify an instance in the electronic design at least by examining the one or more inputs comprising connectivity information that further includes at least a physical netlist or a layout of the electronic design, to identify at least one power pin and/or at least one ground pin of the instance based in part or in whole upon the connectivity information, and to identify one or more connections to and/or from the at least one power pin and/or the at least one ground pin.

25. The system for claim 24, wherein the one or more microprocessors are further configured to determine one or more first power domains for the one or more connections, to determine whether the instance includes only the at least one power pin and no other power pins, to identify a power net connected to the at least one power pin and a first power domain of the power net when the instance includes only the at least one power pin, and to associate the instance with the first power domain of the power net.

* * * * *